April 3, 1945. G. A. ARMSTRONG 2,373,002
NUT FOR EAR ORNAMENTS
Filed March 22, 1944
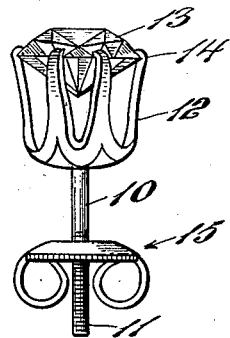
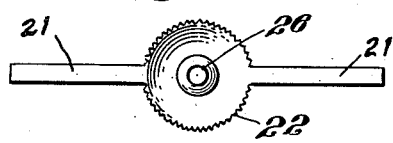
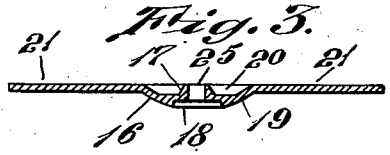
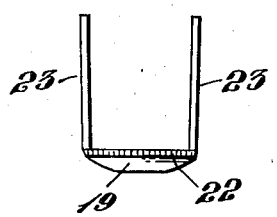
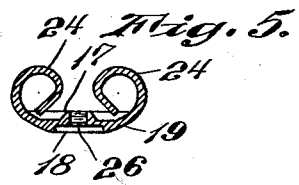
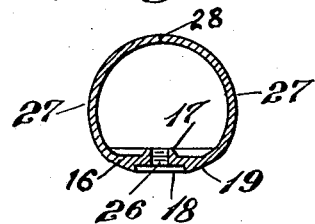
INVENTOR
George A. Armstrong
BY Barlow & Barlow
ATTORNEYS Patented Apr. 3, 1945

2,373,002

UNITED STATES PATENT OFFICE 2,373,002

NUT FOR EAR ORNAMENTS

George A. Armstrong, Barrington, R. I., assignor to Budlong, Docherty & Armstrong, Providence, R. I., a co-partnership Application March 22, 1944, Serial No. 527,610

3 Claims. (Cl. 85—32)

This invention relates to an ear ornament and more particularly to a wing nut which is used for securing the ornament in position.

In the use of ear ornaments of the character herein referred to a nut is utilized for threaded engagement with the stud to hold the portion of the ornament which pierces the ear in position on the ear. The nut which is used is usually struck up then threaded and then a handle, for manual engagement to turn the same, is formed of a separate piece of stock and soldered to the nut. The soldering of a handle in position usually requires the soldering of each end of a bale-like wire and is an expensive procedure and a procedure which is very slow even with the most experienced help. When there is a shortage of help the formation of nuts for the ear ornament is often a bottle neck in large production of ear ornaments.

One of the objects of this invention is to provide a wing nut which may be formed up quickly and easily and equally strong with the wing nuts which were heretofore provided utilizing soldering.

Another object of this invention is to provide a wing nut entirely of one piece of stock.

Another object of this invention is to provide a wing nut without the use of solder.

With these and other objects in view, the invention consists of certain novel features of construction, as will be more fully described and particularly pointed out in the appended claims.

In the accompanying drawing:

Fig. 1 is a side elevation of the ornament with my nut in position thereon;

Fig. 2 is a plan view of the nut partially formed;

Fig. 3 is a sectional view of the structure shown in Fig. 2;

Fig. 4 is a side elevation showing the arms bent upwardly from the edges of the body of the nut;

Fig. 5 is a sectional view illustrating the arms as bent inwardly so as to provide the handle portion;

Fig. 6 is a sectional view of a modified bending of the arms.

With reference to the drawing, 10 designates a shank or stud of the ear ornament which is threaded from one end inwardly as at 11. At the opposite end of this shank a crown gem mounting 12 is provided which holds the gem 13 in position by bending over of the prongs 14 thereon in their usual setting arrangement. The nut, which is provided for threaded engagement with the threads 11, is designated generally 15.

This nut 15 consists of a structure which is formed up of flat sheet stock of uniform thickness, the same being struck so as to cup the body and draw up from the central body 16 an axially extending portion 17 which becomes thicker in an axial direction to provide sufficient stock for threading and at the same time recess the outer surface as at 18. After drawing, that portion which forms the collar 17 is threaded. This drawing operation concaves the body as at 19 on one side and convexes it as at 20 on the other side which is of the thickness of the sheet stock and thus thinner axially than the threaded collar. Arms 21, extending from diametrically opposite points of the body, are provided which will be formed of the same piece of stock as the body and thus of the same thickness as the marginal edge 22 of the body.

After striking the blank as shown in Figs. 2 and 3, the arms 21 are bent upwardly in a press as shown at 23 in Fig. 4 and then rolled inwardly in another press as at 24 in Fig. 5, so as to provide two handle or wing portions located at diametrically opposite points from the central opening 25 which is threaded as at 26 at any time after the formation of the opening and the thickened portion 17 as illustrated in Fig. 3.

Some cases instead of providing the arms with coils as shown in Fig. 5 these arms, now designated 27 in Fig. 6, are brought upwardly into abutting relation at 28 and there secured in such abutting relation in any convenient manner. Soldering may be used if desired. The body, however, as shown in Fig. 6 and which bears the same reference numeral as the body in the other figures, is the same as that heretofore described.

By this arrangement which I have provided the nut and handle or wings are provided all in one piece without the necessity and expense of positioning two parts in correct relationship and soldering them together. In such structures as shown in Fig. 5 no soldering whatsoever is necessary and yet adequate handles are provided located at either side of the central hole for manipulation of the nut. The handles at either side of the central hole permit the nut to be threaded onto the stud 10 an unlimited extent whereas if a stop is desired the handles may be formed to connect one with the other as shown in Fig. 6. This, however, would limit the extent to which the nut could be threaded onto the stud.

I claim:

1. A nut for an article of jewelry formed of sheet stock and comprising a body having an axially extending portion in which there is an axially extending threaded opening, said opening being surrounded by a portion having an axial dimension less than the portion containing the threaded opening, and arm strips of the same piece of sheet material as the body and of a thickness less than said axial dimension of the portion containing said opening extending upwardly and inwardly over the body to provide a handle for turning the nut.

2. A nut for an article of jewelry formed of sheet stock and comprising a body having an axially extending portion in which there is an axially extending threaded opening, said opening being surrounded by a portion having an axial dimension less than the portion containing the threaded opening, and arm strips, of the same piece of sheet material as the body and of a thickness less than said axial dimension of the portion containing said opening, folded inwardly toward each other from diametrically opposite edges of the body with their end portions in abutting relation to form a single loop to provide a handle portion for turning the nut.

3. A nut for an article of jewelry formed of sheet stock and comprising a body having an axially extending portion in which there is an axially extending threaded opening, said opening being surrounded by a portion having an axial dimension less than the portion containing the threaded opening, and arm strips, of the same piece of sheet material as the body and of a thickness less than said axial dimension of the portion containing said opening, folded inwardly toward each other from diametrically opposite edges of the body into separate spaced coils at either side of the center of the body to provide a handle portion for turning the nut.

GEORGE A. ARMSTRONG.